United States Patent
Yao et al.

(10) Patent No.: US 11,920,762 B2
(45) Date of Patent: Mar. 5, 2024

(54) METHOD FOR CONTROLLING ILLUMINATING DEVICE, AND APPARATUS, AIRCRAFT, AND SYSTEM THEREOF

(71) Applicant: SZ DJI TECHNOLOGY CO., LTD., Shenzhen (CN)

(72) Inventors: Yuan Yao, Shenzhen (CN); Yaozhong Hu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 610 days.

(21) Appl. No.: 17/119,405

(22) Filed: Dec. 11, 2020

(65) Prior Publication Data

US 2021/0131644 A1    May 6, 2021

Related U.S. Application Data

(63) Continuation of application No. PCT/CN2018/095285, filed on Jul. 11, 2018.

(51) Int. Cl.
| | |
|---|---|
| *F21V 14/02* | (2006.01) |
| *B64C 39/02* | (2023.01) |
| *B64D 47/00* | (2006.01) |
| *G03B 15/00* | (2021.01) |
| *G03B 15/03* | (2021.01) |

(Continued)

(52) U.S. Cl.
CPC ............ *F21V 14/02* (2013.01); *B64C 39/024* (2013.01); *B64D 47/00* (2013.01); *G03B 15/006* (2013.01); *G03B 15/03* (2013.01); *H04N 23/56* (2023.01); *B64U 2101/00* (2023.01); *B64U 2101/30* (2023.01); *F21W 2107/30* (2018.01); *G03B 2215/0521* (2013.01)

(58) Field of Classification Search
None
See application file for complete search history.

(56) References Cited

U.S. PATENT DOCUMENTS

| | | | | |
|---|---|---|---|---|
| 5,589,901 A | * | 12/1996 | Means | B64D 47/08 |
| | | | | 396/12 |
| 8,488,841 B2 | * | 7/2013 | Lee | F21V 19/02 |
| | | | | 382/103 |

(Continued)

FOREIGN PATENT DOCUMENTS

| | | |
|---|---|---|
| CN | 1493911 A | 5/2004 |
| CN | 101718385 A | 6/2010 |

(Continued)

OTHER PUBLICATIONS

US 9,185,354 B2, 11/2015, Venetianer et al. (withdrawn)

(Continued)

*Primary Examiner* — Rodney E Fuller
(74) *Attorney, Agent, or Firm* — ANOVA LAW GROUP, PLLC

(57) ABSTRACT

A control method for an illuminating device, which is mounted on an aircraft having an image acquisition apparatus, includes obtaining attitude data of an image acquisition apparatus and rotating the illumination device, according to the attitude data of the image acquisition apparatus, to match an illumination area of the illumination device with a photographing area of the image acquisition apparatus.

20 Claims, 2 Drawing Sheets

(51) Int. Cl.
    *H04N 23/56*     (2023.01)
    *B64U 101/00*     (2023.01)
    *B64U 101/30*     (2023.01)
    *F21W 107/30*     (2018.01)

(56) References Cited

U.S. PATENT DOCUMENTS

| | | | |
|---|---|---|---|
| 9,715,756 | B2 | 7/2017 | Engle |
| 10,670,249 | B1* | 6/2020 | Brahmbhatt ......... B60Q 1/0483 |
| 2002/0031252 | A1 | 3/2002 | Rozin |
| 2006/0210256 | A1 | 9/2006 | Fukui et al. |

FOREIGN PATENT DOCUMENTS

| | | |
|---|---|---|
| CN | 101828469 A | 9/2010 |
| CN | 202631918 U | 12/2012 |
| CN | 202907064 U | 4/2013 |
| CN | 104044734 A | 9/2014 |
| CN | 104580924 A | 4/2015 |
| CN | 104967776 A | 10/2015 |
| CN | 105072329 A | 11/2015 |
| CN | 204836402 U | 12/2015 |
| CN | 105822975 A | 8/2016 |
| CN | 106506951 A | 3/2017 |
| CN | 107018300 A | 8/2017 |
| CN | 206797758 U | 12/2017 |
| CN | 108965733 A | 12/2018 |
| IN | 103714345 A | 4/2014 |
| JP | 2003036704 A | 2/2003 |
| JP | 2007037617 A | 2/2007 |
| JP | 2010079033 A | 4/2010 |
| WO | 2016059877 A1 | 4/2016 |

OTHER PUBLICATIONS

The World Intellectual Property Organization (WIPO) International Search Report for PCT/CN2018/095285 dated Apr. 17, 2019 5 pages.

* cited by examiner

METHOD FOR CONTROLLING ILLUMINATING DEVICE, AND APPARATUS, AIRCRAFT, AND SYSTEM THEREOF

CROSS-REFERENCE TO RELATED APPLICATION

This application is a continuation of PCT Patent Application No. PCT/CN2018/095285, filed on Jul. 11, 2018, the entire content of which is incorporated herein by reference.

TECHNICAL FIELD

The present disclosure relates to the technical field of electronic technology and, in particular, relates to a control method for an illuminating device, an apparatus, an aircraft and a system having the same.

BACKGROUND

With the development of computer technologies and responding to user's needs, the applications of aircraft such as unmanned aircraft become more extensive. The unmanned aircraft capable of capturing media files such as images or videos mainly includes a gimbal, an image acquisition apparatus, and a body. The illuminating device and image acquisition apparatus can be mounted at the gimbal. When the unmanned aircraft shoots images at night or in weak light scenes, the to-be-captured object is illuminated by the illuminating device. However, often, in these scenes, the quality of the media file obtained by the image acquisition apparatus can be relatively low.

SUMMARY

According to one aspect of the present disclosure, a control method for an illuminating device is provided. The illuminating device is mounted on an aircraft having an image acquisition apparatus. The method includes obtaining attitude data of an image acquisition apparatus and rotating the illumination device, according to the attitude data of the image acquisition apparatus, to match an illumination area of the illumination device with a photographing area of the image acquisition apparatus.

According to another aspect of the present disclosure, a control apparatus is provided. The apparatus includes a memory and a processor. The memory is configured to store a program instruction. The processor executes the program instruction stored in the memory, and when executing the program instruction, the processor is configured to: obtain attitude data of an image acquisition apparatus; and control an illuminating device to rotate according to the attitude data of the image acquisition apparatus, to match an illumination area of the illumination device with a photographing area of the image acquisition apparatus.

According to another aspect of the present disclosure, an aircraft is provided. The aircraft includes a body, and a power system disposed at the body to supply flight power, and a control apparatus. The apparatus includes a memory and a processor. The memory is configured to store a program instruction. The processor executes the program instruction stored in the memory, and when executing the program instruction, the processor is configured to: obtain attitude data of an image acquisition apparatus on the aircraft; and control an illuminating device mounted on the aircraft to rotate according to the attitude data of the image acquisition apparatus, to match an illumination area of the illumination device with a photographing area of the image acquisition apparatus.

BRIEF DESCRIPTION OF THE DRAWINGS

In order to more clearly describe the technical solutions in the embodiments of the present disclosure, the following will briefly introduce the drawings for the description of the embodiments. Apparently, the drawings in the following description are only some embodiments of the present disclosure. For those of ordinary skill in the art, other drawings can be obtained based on these drawings without creative efforts.

DETAILED DESCRIPTION

The technical solutions in the embodiments of the present disclosure will described below in conjunction with the accompanying drawings. Apparently, the described embodiments are only some embodiments of the present disclosure, rather than all embodiments. Based on the described embodiments of the present disclosure, other embodiments obtained by those of ordinary skill in the art without creative efforts shall fall within the scope of the disclosure.

The embodiments of the present disclosure will be described in detail as follows in conjunction with the accompanying drawings. In the case of no conflict, the following embodiments and features in the embodiments can be replaced by and/or combined with each other.

A control method for an illuminating device provided by the present disclosure may be implemented by a control apparatus, which can be disposed at an aircraft capable of capturing media files such as images or videos, or at a remote control on the ground. The aircraft may include an unmanned aerial vehicle (UAV) or a movable device. In one embodiment, the movable device may include a single-person aircraft, which is composed of a micro jet engine and a control system. The engine can generate thrust to lift a single person into the air, and the control system can maintain balance and change the flight status. The control method for the illuminating device can be applied to tasks of capturing aircraft-based image or video. In certain other embodiments, it can also be applied to tasks of photographing movable devices such as robots that can move autonomously. The control method for the illuminating device applied to the aircraft will be illustrated as follows.

In some embodiments, the control method for the illuminating device may implement a solution to control movement of the illuminating device to follow the gimbal, which can be applied to an aircraft. The aircraft can obtain attitude data of an image acquisition apparatus and control rotation of the illuminating device according to the attitude data of the image acquisition apparatus, to match an illumination area of the illuminating device with a photographing area of the image acquisition apparatus. Compared with traditional aircraft, where the illuminating device and image acquisition apparatus are mounted at the gimbal, and during the flight of the aircraft at night or at a weak light environment, quality of the media files captured by the image acquisition apparatus can be relatively low, in the present disclosure, the illuminating device may rotate according to the attitude data of the image acquisition apparatus to match the illumination area of the illuminating device with the photographing area of the image acquisition apparatus. Accordingly, the illuminating device can effectively compensate light to the to-be-captured object during the photographing of the image acquisition apparatus, which improves the quality of the media files captured by the image acquisition apparatus.

Figure 1:
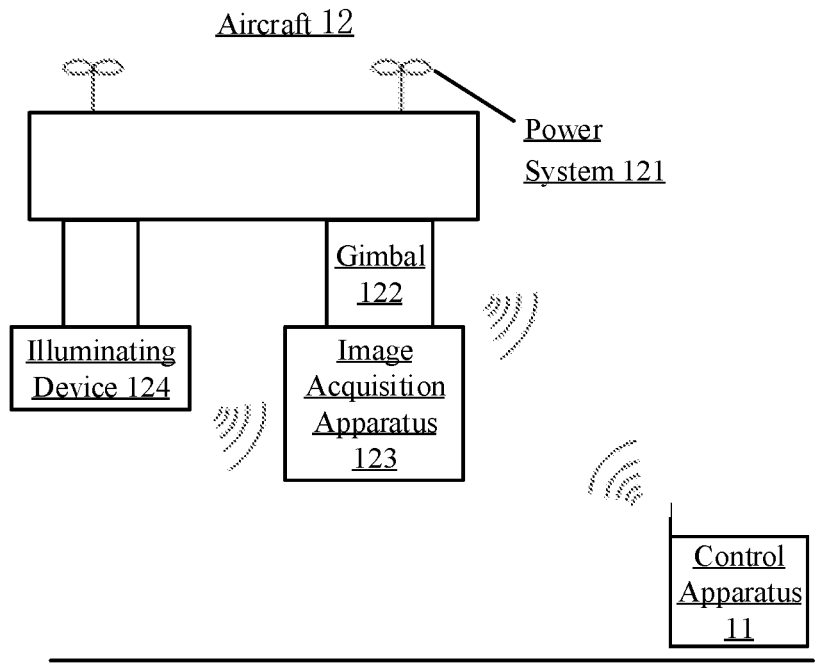
FIG. 1 is a schematic structural diagram of a control system for an illuminating device according to an embodiment of the present disclosure.

Referring to FIG. 1, a schematic structural diagram of a control system for the illuminating device according to an embodiment of the present disclosure, the system may include: a control apparatus 11 and an aircraft 12. The control apparatus 11 may be a control terminal of the aircraft 12, and specifically, may be one or more of: a remote control, a smart phone, a tablet computer, a laptop, a ground station, and a wearable device (e.g., a watch, or a bracelet). The aircraft 12 may be a rotary-wing UAV, such as a quadrotor UAV, a hexarotor UAV, an eight-rotor UAV, or a fixed-wing UAV. The aircraft 12 may include a power system 121 configured to supply flight power to the aircraft. The power system 121 may include one or more of: a propeller, a motor, and an electronic speed control (ESC). The aircraft 12 may also include a gimbal 122, an image acquisition apparatus 123, and an illuminating device 124. The image acquisition apparatus 123 may be mounted at a body of the aircraft 12 through the gimbal 122. The image acquisition apparatus 123 may be configured to capture image or video during the flight of the aircraft 12, including, but not limited to: multispectral imagers, hyperspectral imagers, visible light cameras and infrared cameras, etc. The gimbal 122 may be a multi-axis rotation and stabilization system. The gimbal motor may compensate photographing angle of the image acquisition apparatus 123 by adjusting rotation angle of the rotation shaft and prevent or reduce shaking of the image acquisition apparatus 123 by setting an appropriate buffer mechanism. The illuminating device 124 may be mounted at the body of the aircraft 12, and the illuminating device 124 may be configured to compensate light to the to-be-captured object during the photographing of the image acquisition apparatus 123. The illuminating device 124 may be a multi-axis rotation system, and the illuminating device motor may adjust lighting angle of the illuminating device 124 by adjusting rotation angle of the rotating shaft.

In one embodiment, the control apparatus 11 may obtain the attitude data of the image acquisition apparatus 123, and rotate the illuminating device 124 according to the attitude data of the image acquisition apparatus 123, to match the illumination area of the illuminating device 124 with the photographing area of the image acquisition apparatus 123.

Figure 2:
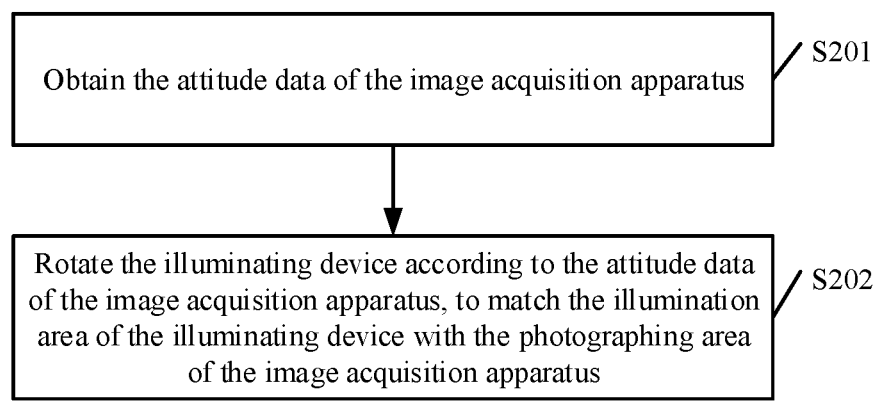
FIG. 2 is a flowchart of a control method for the illuminating device according to an embodiment of the present disclosure.

Referring to FIG. 2, a flowchart of a control method for the illuminating device according to an embodiment of the present disclosure, the method may be implemented by the control apparatus, and the description of the control apparatus may be referred to the above. Specifically, the method according to the embodiments of the present disclosure may include the followings.

S201: Obtaining the attitude data of the image acquisition apparatus.

In some embodiments of the present disclosure, the control apparatus may obtain the attitude data of the image acquisition apparatus during the flight of the aircraft. Resource data of the image acquisition apparatus may include one or more of: a yaw angle (yaw), a pitch angle (pitch), and a roll angle (roll), of the image acquisition apparatus.

In one embodiment, the control apparatus can detect light intensity of the environment in which the aircraft is located. When the light intensity is less than a preset intensity threshold, the control apparatus can determine that the aircraft is flying at night or flying in a weak light environment, which triggers the control apparatus to obtain the attitude data of the image acquisition apparatus.

In one embodiment, there may be two specific ways for the control apparatus to obtain the attitude data of the image acquisition apparatus: (1). The control apparatus may send an attitude data acquisition request to the image acquisition apparatus. The image acquisition apparatus may, in response to the attitude data acquisition request, obtain current attitude data of the image acquisition apparatus, and the image acquisition apparatus may send the attitude data to the control apparatus. (2). The image acquisition apparatus may obtain the current attitude data of the image acquisition apparatus in real-time and send the attitude data to the control apparatus.

S202: Rotating the illuminating device according to the attitude data of the image acquisition apparatus, to match the illumination area of the illuminating device with the photographing area of the image acquisition apparatus.

In some embodiments of the present disclosure, if the aircraft is flying on a horizontal plane and the aircraft's attitude remains unchanged within a preset period of time and the gimbal rotates, the control apparatus may rotate the illuminating device according to the attitude data of the image acquisition apparatus to match the illumination area of the illuminating device with the photographing area of the image acquisition apparatus. For example, when the aircraft is flying on a horizontal plane, the gimbal motor may rotate the image acquisition apparatus by adjusting the rotation angle of the rotation shaft.

Specifically, the matching of the illumination area of the illuminating device with the photographing area of the image acquisition apparatus can be interpreted as a partial or complete overlap of the illumination area of the illuminating device with the photographing area of the image acquisition apparatus. For example, a center point of the illumination area of the illuminating device may overlap with a center point of the photographing area of the image acquisition device. In some embodiments, if a ratio of the overlapping area between the illumination area of the illuminating device and the photographing area of the image acquisition apparatus to the photographing area is greater than a preset ratio threshold, the control device may determine that the illumination area of the illuminating device matches the photographing area of the image acquisition apparatus. In certain other embodiments, if the ratio of the overlapping area between the illumination area of the illuminating device and the photographing area of the image acquisition apparatus to the illumination area is greater than the preset ratio threshold, the control device may determine that the illumination area of the illuminating device matches the photographing area of the image acquisition apparatus.

In one embodiment, the specific manner for the control apparatus to rotate the illuminating device according to the attitude data of the image acquisition apparatus may be that, the control apparatus sends a pulse width modulation (PWM) signal to rotate the motor of the illuminating device in response to the PWM signal. For example, if the yaw angle of the image acquisition apparatus obtained by the control apparatus is 30°, the pitch angle of the image acquisition apparatus obtained by the control apparatus is 10°, and the roll angle of the image acquisition apparatus obtained by the control apparatus is −20°, the control apparatus may generate a PWM signal to control the illuminating device to rotate to an attitude with the yaw angle of 30°, the pitch angle of 10°, and the roll angle of −20°, and the control apparatus may send the PWM signal to the illuminating device. The motor of the illuminating device can rotate, in response to the PWM signal, to an attitude with the yaw angle of 30°, the pitch angle of 10°, and the roll angle of −20°.

In some embodiments, the specific manner for the control apparatus to rotate the illuminating device according to the attitude data of the image acquisition apparatus may be that, rotate the illuminating device until the attitude data of the illuminating device matches the attitude data of the image acquisition apparatus. For example, the yaw angle of the image acquisition apparatus obtained by the control apparatus may be 30°, the pitch angle of the image acquisition apparatus obtained by the control apparatus may be 10°, and the roll angle of the image acquisition apparatus obtained by the control apparatus may be −20°, and the attitude data of the illuminating device that matches the attitude data of the image acquisition apparatus may include: the yaw angle to be any angle in a range of 20°-40°, the pitch angle to be any angle in a range of 0°-20°, and the roll angle to be any angle in a range of −10°-30°, then the control apparatus can rotate the illuminating device to an attitude with the yaw angle to be any angle in the range of 20°-40°, the pitch angle to be any angle in the range of 0°-20°, and the roll angle to be any angle in the range of −10°-30°. Further, the range setting may include but is not limited to the above methods. For example, the difference between the yaw angle of the image acquisition apparatus and a minimum yaw angle of the range may be 30° or 15°, etc., and the difference between a maximum yaw angle of the range and the yaw angle of the image acquisition apparatus may be 30° or 35°, etc., which is not specifically limited by the embodiments of the present disclosure.

In the embodiments of the present disclosure, attitude data required by the illuminating device may be the same as or different from the attitude data of the image acquisition apparatus. The method for obtaining the attitude data required by the illuminating device may include but is not limited to the above methods. As long as the illuminating device can rotate until the illumination area of the illuminating device matches the photographing area of the image acquisition apparatus, the attitude data for rotating the illuminating device can be the attitude data required by the illuminating device.

In one embodiment, the specific manner for the control apparatus to rotate the illuminating device according to the attitude data of the image acquisition apparatus may be that, the control device obtains a distance between the image acquisition apparatus and the to-be-captured object, and when the distance is greater than a preset distance threshold, the control device can rotate the illuminating device according to the attitude data of the image acquisition apparatus and the distance. Further, the aircraft may remain in flight, and when the distance between the image acquisition apparatus and the captured subject is relatively long, the illuminating device can have enough time to rotate so that after the rotation, the illuminating device can compensate light to the to-be-captured object during the photographing of the image acquisition apparatus. At different distances, the rotation angle of the illuminating device may also be different. The rotation angle may include one or more of: the yaw angle, the pitch angle, and the roll angle, of the illuminating device.

In one embodiment, after the control device obtains the distance between the image acquisition apparatus and the to-be-captured object, and when the distance is less than or equal to the preset distance threshold, the control device may keep the attitude of the illuminating device unchanged. Further, the aircraft may remain in flight, and when the distance between the image acquisition apparatus and the to-be-captured object is relatively short, the illuminating device may not have enough time to rotate, so that after the rotation, the illuminating device can compensate light to the to-be-captured object during the photographing of the image acquisition apparatus; and when the distance is less than or equal to the preset distance threshold, the attitude of the illuminating device can remain unchanged, which improves utilization of the system resources.

In one embodiment, the control apparatus can obtain the attitude data of the aircraft's body, and process the attitude data of the image acquisition apparatus and the attitude data of the body to obtain the attitude data required by the illuminating device, and according to the attitude data required by the illuminating device, rotate the illuminating device until the attitude data of the illuminating device is the same as the attitude data required by the illuminating device.

For example, if the illuminating device is mounted below a tail of the aircraft and the image acquisition apparatus is mounted below a head of the aircraft, the attitude of the body may affect the way that the illuminating device rotates. For example, when the pitch angle of the body is 10°, the yaw angle of the body is 0°, the roll angle of the body is 0°, the pitch angle of the image acquisition apparatus is 0°, the yaw angle of the image acquisition apparatus is 0°, and the roll angle of the image acquisition apparatus is 0°, to ensure that the illumination area of the illuminating device matches the photographing area of the image acquisition apparatus, the control apparatus may rotate the illuminating device to an attitude with the pitch angle to be any angle in a range of 0-10°, the yaw angle to be 0°, and the roll angle to be 0°.

Further, if the illuminating device is mounted above the tail of the aircraft and the image acquisition equipment is mounted above the head of the aircraft, the attitude of the body may also affect the way that the illuminating device rotates. For example, when the pitch angle of the body is 10°, the yaw angle of the body is 0°, the roll angle of the body is 0°, the pitch angle of the image acquisition apparatus is 0°, the yaw angle of the image acquisition apparatus is 0°, and the roll angle of the image acquisition apparatus is 0°, to ensure that the illumination area of the illuminating device matches the photographing area of the image acquisition apparatus, the control apparatus may rotate the illuminating device to an attitude with the pitch angle to be any angle in the range of 0-10°, the yaw angle to be 0°, and the roll angle to be 0°.

In one embodiment, if a field of view (FOV) of a light source of the illuminating device is adjustable, the control apparatus may determine the FOV of the light source of the illuminating device according to the FOV of the image acquisition apparatus. For example, the control apparatus may determine the FOV of the light source of the illuminating device to be the same as the FOV of the image acquisition apparatus. For example, when the FOV of the image acquisition apparatus is 30°, the control apparatus may control the FOV of the light source of the illuminating device to be 30°. Further, the control apparatus can determine the difference between the FOV of the light source of the illuminating device and the FOV of the image acquisition apparatus to be less than a preset angle threshold. For example, when the FOV of the image acquisition apparatus is 30°, the control apparatus can adjust the FOV of the light source of the illuminating device to be 20°-40°.

In one embodiment, if the FOV of the light source of the illuminating device is not adjustable, and the FOV of the image acquisition apparatus is changed, the control apparatus can adjust the orientation of the illuminating device; that is, rotate the illuminating device according to the FOV after the image acquisition apparatus changes, so that the illumination area of the illuminating device can match the photographing area of the image acquisition apparatus.

In operation, there may be three specific manners for the control apparatus to determine whether the FOV of the image acquisition apparatus has changed: (1). When digital zoom of the image acquisition apparatus is detected, the control apparatus can determine that the FOV of the image acquisition apparatus has changed. Digital zoom, that is, enlarging area of each pixel in the picture through a processor of the image acquisition apparatus. (2). When optical zoom of the image acquisition apparatus is detected, the control apparatus can determine that the FOV of the image acquisition apparatus has changed. Optical zoom, that is, achieving zooming by adjusting positions of a lens of the image acquisition apparatus, the to-be-captured object and a focus. (3). When detecting that the lens of the image acquisition apparatus has changed, the control apparatus can determine that the FOV of the image acquisition apparatus has changed. The lens of the image acquisition apparatus can be a fisheye lens, a wide lens or an ultra-wide lens. A focal length of different lenses may be different, and the FOV of the image acquisition apparatus with different lenses may also be different.

In one embodiment, the control apparatus can adjust the light intensity of the illuminating device according to the distance between the image acquisition apparatus and the to-be-captured object. For example, when the distance is greater than a first preset threshold, the control apparatus may adjust the light intensity of the illuminating device to be the first light intensity; and when the distance is less than or equal to the first preset threshold, the control apparatus may adjust the light intensity of the illuminating device to a second light intensity, and the first light intensity is greater than the second light intensity. Further, the control apparatus may establish different distance intervals and their corresponding light intensities in advance and adjust the light intensity of the illuminating device to be the light intensity corresponding to the distance interval to which the distance belongs.

In one embodiment, the control device can adjust the light intensity of the illuminating device according to an exposure time of the image acquisition apparatus. For example, when the exposure time is greater than the second preset threshold, the control apparatus may adjust the light intensity of the illuminating device to be the first light intensity; and when the exposure time is less than or equal to the second preset threshold, the control apparatus may adjust the light intensity of the illuminating device to be the second light intensity, and the first light intensity is less than the second light intensity. Further, the control apparatus may establish different exposure time intervals and their corresponding light intensities in advance and adjust the light intensity of the illuminating device to be the light intensity corresponding to the exposure time interval to which the exposure time belongs.

In one embodiment, the control device can adjust the light intensity of the illuminating device according to an ambient brightness of the environment where the aircraft is currently located. The current environment of the aircraft can be day, night, or cloudy. The brightness of the environment during the day is higher than that of the cloudy environment, and the brightness of the environment on a cloudy day is higher than that of a dark night. For example, when the ambient brightness is greater than a third preset threshold, the control apparatus may adjust the light intensity of the illuminating device to be the first light intensity; and when the ambient brightness is less than or equal to the third preset threshold, the control apparatus may adjust the light intensity of the illuminating device to be the second light intensity, and the first light intensity is less than the second light intensity. Further, the control apparatus may establish different ambient brightness intervals and their corresponding light intensities in advance and adjust the light intensity of the illuminating device to be the light intensity corresponding to the ambient brightness interval to which the ambient brightness belongs.

In one embodiment, the control apparatus can adjust the exposure time of the image acquisition apparatus according to the distance between the image acquisition apparatus and the to-be-captured object and the light intensity. For example, when the distance is greater than a fourth preset threshold and the light intensity is less than a fifth preset threshold, the control apparatus may adjust the exposure time of the illuminating device to be a first duration; and when the distance is less than or equal to the fourth preset threshold, and the light intensity is greater than or equal to the fifth preset threshold, the control apparatus may adjust the exposure time of the illuminating device to be a second duration, and the first duration is greater than the second duration. Further, the control apparatus may establish different distance intervals, light intensity intervals and their corresponding exposure times in advance and adjust the exposure time of the illuminating device to be the exposure time corresponding to the distance interval to which the distance belongs and the light intensity interval to which the light intensity belongs.

In the embodiments of the present disclosure, the illuminating device may rotate according to the attitude data of the image acquisition apparatus to match the illumination area of the illuminating device with the photographing area of the image acquisition apparatus, so that the illuminating device can effectively compensate light to the to-be-captured object during the photographing of the image acquisition apparatus, which improves the quality of media files captured by the image acquisition apparatus.

Figure 3:
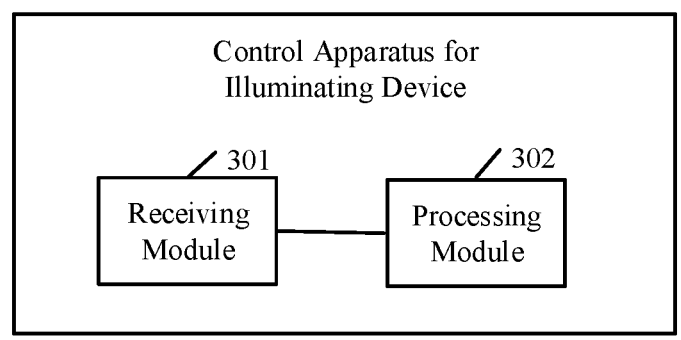
FIG. 3 is a schematic structural diagram of a control device for the illuminating device according to an embodiment of the present disclosure.

Referring to FIG. 3, a schematic structural diagram of a control device for the illuminating device according to an embodiment of the present disclosure, which may be configured to implement the functions of the control apparatus as shown in FIG. 2. The functional blocks of the control device for illuminating device may be implemented by a hardware, a software or a combination of hardware and software to implement the solution of the present disclosure. Those skilled in the art should understand that the functional blocks described in FIG. 3 can be combined or separated into several sub-blocks to implement the solution of the present disclosure. Therefore, the above-described content in the present disclosure can support any possible combination or separation or further definition of the following functional modules.

As shown in FIG. 3, the control device for the illuminating device may include: a receiving module 301 and a processing module 302. The detailed description of each module is as follows.

The receiving module 301 may be configured to obtain attitude data of the image acquisition apparatus. The processing module 302 may be configured to control the illuminating device to rotate according to the attitude data of the image acquisition apparatus, to match the illumination area of the illuminating device with the photographing area of the image acquisition apparatus.

In one embodiment, the receiving module 301 may be further configured to obtain the attitude data of the body before the processing module 302 controls the illuminating device to rotate according to the current attitude data of the image acquisition apparatus.

The processing module 302 may control the illuminating device to rotate according to the attitude data of the image acquisition apparatus, including: processing the attitude data of the image acquisition apparatus and the attitude data of the body to obtain the attitude data required by the illuminating device; and controlling the illuminating device to rotate according to the attitude data required by the illuminating device.

In one embodiment, the processing module 302 may control the illuminating device to rotate according to the attitude data of the image acquisition apparatus, including controlling the illuminating device to rotate until the attitude data of the illuminating device matches the attitude data of the image acquisition apparatus.

In one embodiment, the processing module 302 may be further configured to determine the FOV of the light source of the illuminating device according to the FOV of the image acquisition apparatus.

In one embodiment, the processing module 302 may control the illuminating device to rotate according to the attitude data of the image acquisition apparatus, including: obtaining the distance between the image acquisition apparatus and the to-be-captured object; when the distance is greater than a preset distance threshold, controlling the illuminating device to rotate according to the attitude data of the image acquisition apparatus and the distance; and when the distance is less than or equal to the preset distance threshold, keeping the attitude of the illuminating device unchanged.

In one embodiment, the processing module 302 may be further configured to adjust light intensity of the illuminating device according to the distance.

In one embodiment, the processing module 302 may control the illuminating device to rotate according to the attitude data of the image acquisition apparatus, including: according to the attitude data of the image acquisition apparatus, sending a PWM signal to a motor of the illuminating device to rotate the motor in response to the PWM signal.

In one embodiment, the attitude data may include one or more of: a yaw angle, a pitch angle, and a roll angle, of the image acquisition apparatus.

The implementation of each module can also be referred to the corresponding description of the modules of FIG. 2 according to some embodiments of the present disclosure.

The division of modules in the embodiments of the present application are illustrative and may only be a logical function division. There can be other division manners in actual implementation. The functional modules in the embodiments of the present disclosure may be integrated into one processing module, or each module may physically exist by itself, or two or more modules may be integrated into one module. The above-mentioned integrated modules can be implemented in the form of a hardware or a software functional module.

Figure 4:
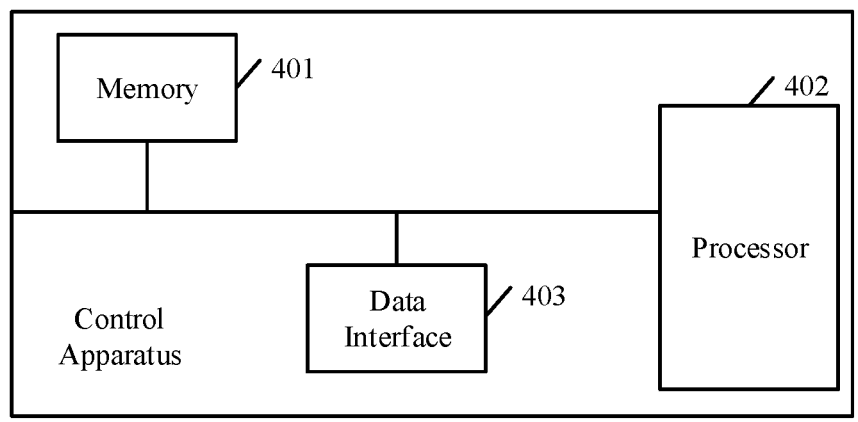
FIG. 4 is a schematic structural diagram of a control apparatus according to an embodiment of the present disclosure.

Referring to FIG. 4, a schematic structural diagram of a control apparatus according to an embodiment of the present disclosure, specifically, the control apparatus may include: a memory 401, a processor 402, and a data interface 403. The data interface 403 may be configured to obtain the attitude data of the image acquisition apparatus.

The memory 401 may include a volatile memory. The memory 401 may further include a non-volatile memory. The memory 401 may further include a combination of the foregoing types of memories. The processor 402 may be a central processing unit (CPU). The processor 402 may further include a hardware chip. The hardware chip may be an application-specific integrated circuit (ASIC), a programmable logic device (PLD) or a combination thereof. The PLD may be a complex programmable logic device (CPLD), a field-programmable gate array (FPGA), or any combination thereof.

In some embodiments, the memory 401 may be configured to store a program instruction. The processor 402 can call the program instruction stored in the memory 401 to execute the following steps: obtaining the attitude data of the image acquisition apparatus; according to the attitude data of the image acquisition apparatus, controlling the illumination device to rotate, to match the illumination area of the illumination device with the photographing area of the image acquisition apparatus.

In one embodiment, before controlling the illuminating device to rotate according to the current attitude data of the image acquisition apparatus, the processor 402 may further perform the following operations: obtaining the attitude data of the airframe of the aircraft; and according to the attitude data of the image acquisition apparatus, controlling the illuminating device to rotate. Specifically, the processor 402 may process the attitude data of the image acquisition apparatus and the attitude data of the body to obtain the attitude data required by the illuminating device; and according to the attitude data required by the illuminating device, control the illuminating device to rotate.

In one embodiment, the processor 402 may control the illuminating device to rotate according to the attitude data of the image acquisition apparatus. Specifically, the processor 402 may control the illuminating device to rotate until the attitude data of the illuminating device matches the attitude data of the image acquisition apparatus.

In one embodiment, the processor 402 may further perform the following operations: according to the FOV of the image acquisition apparatus, determining the FOV of the light source of the illuminating device.

In one embodiment, the processor 402 may control the illuminating device to rotate according to the attitude data of the image acquisition apparatus. Specifically, the processor 402 may: obtain the distance between the image acquisition apparatus and the to-be-captured object; when the distance is greater than a preset distance threshold, control the illuminating device to rotate according to the attitude data of the image acquisition apparatus and the distance; and when the distance is less than or equal to the preset distance threshold, keep the attitude of the illuminating device unchanged.

In one embodiment, the processor 402 may further perform the following operations: according to the distance, adjusting the light intensity of the illuminating device.

In one embodiment, the processor 402 may control the illuminating device to rotate according to the attitude data of the image acquisition apparatus. Specifically, the processor 402 may, according to the attitude data of the image acquisition apparatus, send a PWM signal to the motor of the illuminating device to rotate in response to the PWM signal.

In one embodiment, the attitude data may include one or more of: the yaw angle, the pitch angle, and the roll angle, of the image acquisition apparatus.

For the specific implementation of the processor 401 in the embodiments of the present disclosure, reference can be made to the relevant description in the foregoing embodiments, which will not be repeated here.

The embodiments of the present disclosure may further provide an aircraft, including: a body; a power system disposed at the body and configured to supply flight power; and a processor configured to: obtain attitude data of an image acquisition apparatus; and according to the attitude data of the image acquisition apparatus, control the illuminating device to rotate, to match the illuminating area of the illuminating device with the photographing area of the image acquisition apparatus.

Further, the processor may be configured to execute the following steps: obtaining the attitude data of the body before controlling the illuminating device to rotate according to the current attitude data of the image acquisition apparatus; and controlling the illuminating device to rotate according to the attitude data of the image acquisition apparatus. Specifically, the processor may: process the attitude data of the image acquisition apparatus and the attitude data of the body to obtain the attitude data required by the illuminating device; and according to the attitude data required by the illuminating device, control the illuminating device to rotate.

In one embodiment, the processor may control the illuminating device to rotate according to the attitude data of the image acquisition apparatus. Specifically, the processor may control the illuminating device to rotate until the attitude data of the illuminating device matches the attitude data of the image acquisition apparatus.

In one embodiment, the processor may be further configured to determine the FOV of the light source of the illuminating device according to the FOV of the image acquisition apparatus.

In one embodiment, the processor may control the illuminating device to rotate according to the attitude data of the image acquisition apparatus. Specifically, the processor may: obtain the distance between the image acquisition apparatus and the to-be-captured object; when the distance is greater than a preset distance threshold, control the illuminating device to rotate according to the attitude data of the image acquisition apparatus and the distance; and when the distance is less than or equal to the preset distance threshold, keep the attitude of the illuminating device unchanged.

In one embodiment, the processor may be further configured to adjust the light intensity of the illuminating device according to the distance between the image acquisition apparatus and the to-be-captured object.

In one embodiment, the processor may control the illuminating device to rotate according to the attitude data of the image acquisition apparatus. Specifically, the process may, according to the attitude data of the image acquisition apparatus, send a PWM signal to the motor of the illuminating device to rotate the motor in response to the PWM signal.

In one embodiment, the attitude data may include one or more of: the yaw angle, the pitch angle, and the roll angle, of the image acquisition apparatus.

For implementation of the processor in the aircraft, reference may be made to the control method for the illuminating device as shown in FIG. 2 according to some embodiments, which will not be repeated here. The aircraft may be a four-rotor drone, a six-rotor drone, and a multi-rotor drone. The power system may include a motor, an ESC, a propeller, etc. The motor may be configured to drive the propeller of the aircraft, and the ESC may be configured to adjust rotation speed of the motor of the aircraft.

The embodiments of the present disclosure further provide a control system for the illuminating device, including: a control apparatus and an aircraft. The control apparatus may be configured to send a flight control instruction to the aircraft, and the flight control instruction may be configured to instruct the aircraft to fly according to a determined flight trajectory. The aircraft may be configured to, in response to the flight control instruction, control the aircraft to fly according to the flight trajectory.

The control apparatus may be further configured to: obtain the attitude data of the image acquisition apparatus mounted on the aircraft; and according to the attitude data of the image acquisition apparatus, control the illuminating device mounted on the aircraft to rotate, to match the illumination area of the device with the photographing area of the image acquisition apparatus.

In one embodiment, before controlling the illuminating device to rotate according to the current attitude data of the image acquisition apparatus, the control apparatus may further: obtain the attitude data of the body of the aircraft; and control the illuminating device to rotate according to the attitude data of the image acquisition apparatus, including: processing the attitude data of the image acquisition apparatus and the attitude data of the body to obtain the attitude data required by the illuminating device; and controlling the illuminating device to rotate according to the attitude data required by the illuminating device.

In one embodiment, controlling, by the control apparatus, the illuminating device to rotate according to the attitude data of the image acquisition apparatus may include: controlling the illuminating device to rotate until the attitude data of the illuminating device matches the attitude data of the image acquisition apparatus.

In one embodiment, the control apparatus may be further configured to determine the FOV of the light source of the illuminating device according to the FOV of the image acquisition apparatus.

In one embodiment, controlling, by the control apparatus, the illuminating device to rotate according to the attitude data of the image acquisition apparatus may include: obtaining the distance between the image acquisition apparatus and the to-be-captured object; when the distance is greater than a preset distance threshold, controlling the illuminating device to rotate according to the attitude data of the image acquisition apparatus and the distance; and when the distance is less than or equal to the preset distance threshold, keeping the attitude of the illuminating device unchanged.

In one embodiment, the control apparatus may be further configured to adjust the light intensity of the illuminating device according to the distance between the image acquisition apparatus and the to-be-captured object.

In one embodiment, controlling, by the control apparatus, the illuminating device to rotate according to the attitude data of the image acquisition apparatus may include: according to the attitude data of the image acquisition apparatus, sending a PWM signal to the motor of the illuminating device to rotate the motor in response to the PWM signal.

In one embodiment, the attitude data may include one or more of: the yaw angle, the pitch angle, and the roll angle, of the image acquisition apparatus.

According to the embodiments of the present disclosure, a computer-readable storage medium may be further provided. The computer-readable storage medium may store a computer program, and when the computer program is executed by a processor, the control method for the illuminating device as shown in FIG. 2 may be implemented, and the details will not be repeated here.

The computer-readable storage medium may be an internal storage unit of any device or apparatus described in the foregoing embodiments, such as a hard disk or a memory of such device or apparatus. The computer-readable storage medium may also be an external storage device to the foregoing device or apparatus, such as a plug-in hard disk, a smart memory card (e.g., smart media card (SMC)), a secure digital (SD) card, or a flash card provided by such device or apparatus. Further, the computer-readable storage medium may also include both an internal storage unit of such device or apparatus and an external storage device. The computer-readable storage medium may be configured to store the computer program and other programs and data required by the terminal. The computer-readable storage medium can also be configured to temporarily store output data or data to be output.

A person of ordinary skill in the art can understand that all or part of the processes in the foregoing-mentioned method embodiments can be implemented by instructing relevant hardware through a computer program. The program can be stored in a computer-readable storage medium. During execution, it may implement the procedures in the foregoing-mentioned method embodiments. The storage medium may be a magnetic disk, an optical disc, a read-only memory (ROM), or a random-access memory (RAM), etc.

The above includes only preferred embodiments of the present disclosure. Of course, the scope of the disclosure cannot be limited hereto and hence, equivalent changes made according to the claims of the present disclosure still fall within the scope of the disclosure.

What is claimed is:

1. A control method for an illuminating device, which is mounted on an aircraft having an image acquisition apparatus, the method comprising:
    obtaining a light intensity of an environment in which the aircraft is located;
    in response to the light intensity being less than a preset intensity threshold, obtaining attitude data of the image acquisition apparatus; and
    rotating the illumination device, according to the attitude data of the image acquisition apparatus, to match an illumination area of the illumination device with a photographing area of the image acquisition apparatus.

2. The method according to claim 1, wherein before rotating the illuminating device according to current attitude data of the image acquisition apparatus, the method further comprises:
    obtaining attitude data of a body of the aircraft; and
    rotating the illuminating device according to the attitude data of the image acquisition apparatus comprising:
        processing the attitude data of the image acquisition apparatus and the attitude data of the body to obtain attitude data required by the illuminating device; and
        rotating the illuminating device according to the attitude data required by the illuminating device.

3. The method according to claim 1, wherein rotating the illuminating device according to the attitude data of the image acquisition apparatus comprises:
    rotating the illuminating device until attitude data of the illuminating device matches the attitude data of the image acquisition apparatus.

4. The method according to claim 1, further comprising:
    determining, according to a field of view (FOV) of the image acquisition apparatus, an FOV of a light source of the illuminating device.

5. The method according to claim 1, wherein rotating the illuminating device according to the attitude data of the image acquisition apparatus comprises:
    obtaining a distance between the image acquisition apparatus and a to-be-captured object;
    in response to the distance being greater than a preset distance threshold, rotating the illuminating device according to the attitude data of the image acquisition apparatus and the distance; and
    in response to the distance being less than or equal to the preset distance threshold, keeping an attitude of the illuminating device unchanged.

6. The method according to claim 5, further comprising:
    adjusting, according to the distance, a light intensity of the illuminating device.

7. The method according to claim 1, wherein rotating the illuminating device according to the attitude data of the image acquisition apparatus comprises:
    sending, according to the attitude data of the image acquisition apparatus, a pulse width modulation (PWM) signal to a motor of the illuminating device, to rotate the motor in response to the PWM signal.

8. The method according to claim 1, wherein the attitude data comprises:
    one or more of: a yaw angle, a pitch angle, and a roll angle.

9. A control apparatus, comprising:
    a memory and a processor, wherein:
    the memory is configured to store a program instruction; and
    the processor executes the program instruction stored in the memory, and when executing the program instruction, the processor is configured to:
        obtain a light intensity of an environment in which the aircraft is located;
        in response to the light intensity being less than a preset intensity threshold, obtain attitude data of an image acquisition apparatus; and
        control an illuminating device to rotate according to the attitude data of the image acquisition apparatus, to match an illumination area of the illumination device with a photographing area of the image acquisition apparatus.

10. The apparatus according to claim 9, wherein the illuminating device and the image acquisition apparatus are mounted on an aircraft and, before controlling the illuminating device to rotate according to the attitude data of the image acquisition apparatus, the processor is further configured to:
    obtain attitude data of a body of the aircraft; and
    controlling the illuminating device to rotate according to the attitude data of the image acquisition apparatus comprises:
        processing the attitude data of the image acquisition apparatus and the attitude data of the body to obtain attitude data required by the illuminating device; and controlling the illuminating device to rotate according to the attitude data required by the illuminating device.

11. The apparatus according to claim 9, wherein controlling the illuminating device to rotate according to the attitude data of the image acquisition apparatus comprises:
controlling the illuminating device to rotate until attitude data of the illuminating device matches the attitude data of the image acquisition apparatus.

12. The apparatus according to claim 9, wherein the processor is further configured to:
determine, according to a field of view (FOV) of the image acquisition apparatus, an FOV of a light source of the illuminating device.

13. The apparatus according to claim 9, wherein controlling the illuminating device to rotate according to the attitude data of the image acquisition apparatus comprises:
obtaining a distance between the image acquisition apparatus and a to-be-captured object;
in response to the distance being greater than a preset distance threshold, controlling the illuminating device to rotate according to the attitude data of the image acquisition apparatus and the distance; and
in response to the distance being less than or equal to the preset distance threshold, keeping an attitude of the illuminating device unchanged.

14. The apparatus according to claim 13, wherein the processor is further configured to:
adjust, according to the distance, a light intensity of the illuminating device.

15. The apparatus according to claim 9, wherein controlling the illuminating device to rotate according to the attitude data of the image acquisition apparatus comprises:
sending, according to the attitude data of the image acquisition apparatus, a pulse width modulation (PWM) signal to a motor of the illuminating device to rotate the motor in response to the PWM signal.

16. The apparatus according to claim 9, wherein the attitude data comprises:
one or more of: a yaw angle, a pitch angle, and a roll angle.

17. An aircraft, comprising:
a body;
a power system disposed at the body to supply flight power; and
a control apparatus, comprising:
a memory and a processor, wherein:
the memory is configured to store a program instruction; and
the processor executes the program instruction stored in the memory, and when executing the program instruction, the processor is configured to:
obtaining a light intensity of an environment in which the aircraft is located;
in response to the light intensity being less than a preset intensity threshold, obtain attitude data of an image acquisition apparatus on the aircraft; and
control an illuminating device mounted on the aircraft to rotate according to the attitude data of the image acquisition apparatus, to match an illumination area of the illumination device with a photographing area of the image acquisition apparatus.

18. The aircraft according to claim 17, wherein before controlling the illuminating device mounted on the aircraft to rotate according to the attitude data of the image acquisition apparatus, the processor is further configured to:
obtain attitude data of the body; and
controlling the illuminating device mounted on the aircraft to rotate according to the attitude data of the image acquisition apparatus comprises:
processing the attitude data of the image acquisition apparatus and the attitude data of the body to obtain attitude data required by the illuminating device; and
controlling the illuminating device to rotate according to the attitude data required by the illuminating device.

19. The aircraft according to claim 17, wherein controlling the illuminating device mounted on the aircraft to rotate according to the attitude data of the image acquisition apparatus comprises:
controlling the illuminating device to rotate until attitude data of the illuminating device matches the attitude data of the image acquisition apparatus.

20. The aircraft according to claim 17 wherein the processor is further configured to:
determine, according to a field of view (FOV) of the image acquisition apparatus, an FOV of a light source of the illuminating device.

\* \* \* \* \*